(12) United States Patent
Suleman

(10) Patent No.: US 11,980,114 B2
(45) Date of Patent: May 14, 2024

(54) SYSTEM AND METHOD FOR OPERATING AN AGRICULTURAL SYSTEM

(71) Applicant: CNH Industrial America LLC, New Holland, PA (US)

(72) Inventor: Yaseen Suleman, Glendale Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 199 days.

(21) Appl. No.: 17/243,221

(22) Filed: Apr. 28, 2021

(65) Prior Publication Data

US 2021/0329825 A1  Oct. 28, 2021

Related U.S. Application Data

(60) Provisional application No. 63/016,583, filed on Apr. 28, 2020.

(51) Int. Cl.
*A01B 69/04* (2006.01)

(52) U.S. Cl.
CPC .................. *A01B 69/008* (2013.01)

(58) Field of Classification Search
None
See application file for complete search history.

(56) References Cited

U.S. PATENT DOCUMENTS

| 11,277,956 B2* | 3/2022 | Bertucci | G06V 20/56 |
| 2006/0282205 A1* | 12/2006 | Lange | G01C 21/20 |
| | | | 701/50 |

* cited by examiner

*Primary Examiner* — Tamara L Weber
(74) *Attorney, Agent, or Firm* — Rickard DeMille; Rebecca Henkel; Peter Zacharias

(57) ABSTRACT

A control system for an agricultural system includes a memory configured to store a path and processing circuitry communicatively coupled to the memory. The processing circuitry is configured to receive feedback indicative of a position of the agricultural system, select a selected swath from a plurality of swaths of the path based on the position, in which each swath of the plurality of swaths includes a respective trigger point, and determine that the position of the agricultural system is within a threshold range of the respective trigger point of the selected swath. The processing circuitry is also configured to output a signal to instruct a component of the agricultural system to perform an operation associated with the respective trigger point of the selected swath in response to determining that the position of the agricultural system is within the threshold range of the respective trigger point of the selected swath.

18 Claims, 6 Drawing Sheets

SYSTEM AND METHOD FOR OPERATING AN AGRICULTURAL SYSTEM

CROSS-REFERENCE TO RELATED APPLICATION

This application claims priority from and the benefit of U.S. Provisional Application Ser. No. 63/016,583, entitled "SYSTEM AND METHOD FOR OPERATING AN AGRICULTURAL SYSTEM," filed Apr. 28, 2020, which is hereby incorporated by reference in its entirety.

BACKGROUND

The disclosure relates generally to agricultural systems and, more particularly, to controlling operation of an agricultural system along a path.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Agricultural systems generally follow a target path to perform an agricultural operation, such as a tillage, fertilizing, or planting operation, within an agricultural field. For example, an operator of the agricultural system may control movement of the agricultural system and control operation of various components of the agricultural system to effectively perform the agricultural operation. However, it may be difficult or tedious for the operator to control the operation of multiple components at all times of the agricultural operation. For instance, at certain points of the agricultural operation, it may be difficult to coordinate operation of multiple components to effectively perform the agricultural operation.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a control system for an agricultural system includes a memory configured to store a path and processing circuitry communicatively coupled to the memory. The processing circuitry is configured to receive feedback indicative of a position of the agricultural system, select a selected swath from a plurality of swaths of the path based on the position, in which each swath of the plurality of swaths includes a respective trigger point, and determine that the position of the agricultural system is within a threshold range of the respective trigger point of the selected swath. The processing circuitry is also configured to output a signal to instruct a component of the agricultural system to perform an operation associated with the respective trigger point of the selected swath in response to determining that the position of the agricultural system is within the threshold range of the respective trigger point of the selected swath.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
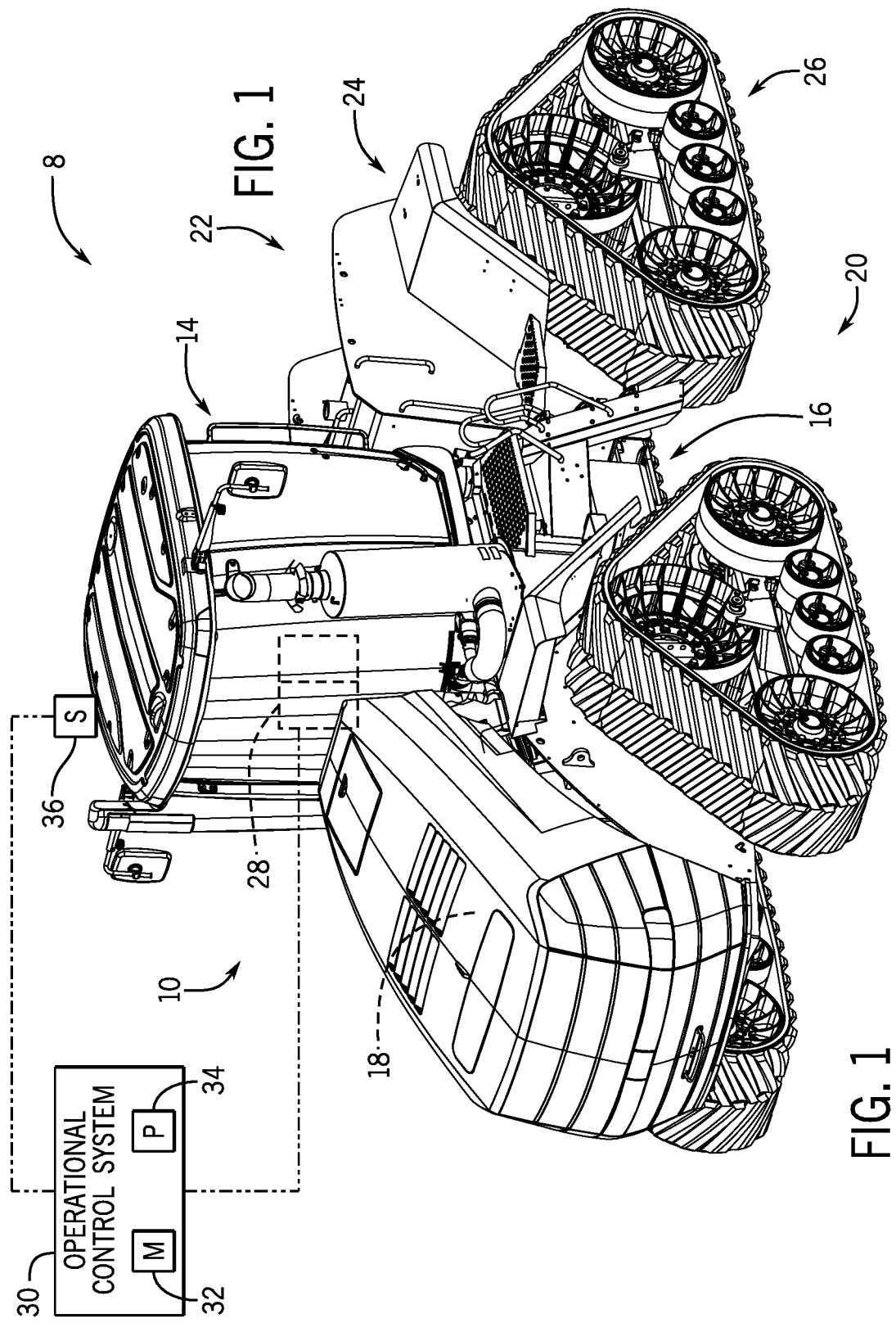
FIG. 1 is a perspective view of an embodiment of an agricultural system having a work vehicle, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

An agricultural system (e.g., including an agricultural vehicle, an implement, an air cart, etc.) may perform various farming operations, including harvesting crops, planting seeds, tilling the ground, and so forth, within an agricultural field. In some embodiments, a path may be established within the agricultural field that the agricultural system follows to facilitate the farming operation. For example, the path may be displayed to an operator of the agricultural system, and the operator may control movement of the agricultural system to follow the path and control components of the agricultural system to perform the farming operation effectively.

However, in some cases, it may be difficult for the operator to control certain aspects of the agricultural system while the agricultural system navigates the path. For instance, in addition to guiding the agricultural system (e.g., by using a steering wheel), the operator may also control operation of various components of the agricultural system to effectuate the farming operation. Thus, it may be difficult for the operator to coordinate guidance of the agricultural system and control each operation of the agricultural system at all times during the farming operation.

Accordingly, the embodiments described herein relate to a control system that causes the agricultural system to perform certain operations based on a location of the agricultural system along the path. For example, the path may have multiple swaths or strips along which the operator may guide the agricultural system, and the control system may determine the swath that the agricultural system is following or traversing based on the location of the agricultural system. As the agricultural system traverses the swath, the control system may cause the agricultural system to perform an operation corresponding to (e.g., appropriate for) the particular swath. In this way, the operator may control movement of the agricultural system (e.g., along the path), and the control system may control operation of certain other components of the agricultural system. Accordingly, the operator's work load may be reduced because the operator does not have to control each aspect of the agricultural system.

With the preceding in mind, FIG. 1 is a perspective view of an embodiment of an agricultural system 8 having a work vehicle 10. In the illustrated embodiment, the work vehicle 10 is a tractor. However, in some embodiments, the work vehicle 10 may be an on-road truck, tractor, harvester, etc. As illustrated, the work vehicle 10 includes a cab 14 mounted on a chassis 16. The chassis 16 may support a motor 18 (e.g., diesel engine, etc.), tracks 20, a hydraulic system (e.g., including a pump, valves, a reservoir, etc.), as well as other systems (e.g., an electrical system, a cooling system, etc.) that facilitate operation of the work vehicle 10. To steer the work vehicle 10, the work vehicle chassis articulates such that rear tracks rotate relative to front tracks. It should be noted that while the work vehicle 10 in FIG. 1 includes tracks 20, in some embodiments, the work vehicle may include wheels or a combination of tracks and wheels that enable steering of the work vehicle. For example, in certain embodiments, the work vehicle may include steerable front wheels and/or steerable rear wheels.

The cab 14 is configured to house an operator of the work vehicle 10 during operation of the work vehicle 10. The cab 14 may be climate controlled and may provide access to various controls of the work vehicle 10. For example, the cab 14 may include controls, such as a hand controller, a steering wheel, and the like, that provide input to a steering control system 22 for steering the work vehicle 10. In operation, the steering control system 22 (e.g., valves, hydraulic actuators, etc.) drives the chassis 16 to articulate, such that a rear assembly 24, which includes rear tracks 26 of the work vehicle 10, rotates through a range of steering angles to steer the work vehicle 10. In some embodiments, the cab 14 may also include a user interface 28 for receiving input to control various operations and systems of the work vehicle 10. For instance, the user interface 28 may include features such as a touchscreen, a display, a trackpad, a mouse, a button, a switch, a slider, another suitable feature, or a combination thereof, with which the operator may interact.

In certain embodiments, the work vehicle 10 is used to tow an agricultural implement of the agricultural system 8. The agricultural implement may be configured to perform a farming operation on an agricultural field. In additional or alternative embodiments, the work vehicle may include various features that enables the work vehicle to performing the farming operation. In any case, the operator may guide the work vehicle 10 along the agricultural field to enable the work vehicle 10 to perform the farming operation within particular regions of the agricultural field. Indeed, the work vehicle 10 may enable the agricultural system 8 to perform any suitable farming operation, such as planting, harvesting, tilling, and the like, via movement through the agricultural field. The operator may also use the user interface 28 to control the farming operation, such as by controlling operation of various components of the work vehicle 10 and/or the implement used for performing the farming operation.

For this reason, the agricultural system 8 includes an operation control system 30 configured to control operation of certain components of the agricultural system (e.g., the work vehicle 10, the implement, etc.) to perform the farming operation. The operation control system 30 includes a memory 32 and processing circuitry 34. The operation control system 30 may also include one or more storage devices and/or other suitable components. The processing circuitry 34 may include multiple microprocessors, one or more "general-purpose" microprocessors, one or more special-purpose microprocessors, and/or one or more application specific integrated circuits (ASICS), or some combination thereof, and the processing circuitry 34 may be used to execute software, such as software for controlling the agricultural system 8, including features of the work vehicle 10. For example, the processing circuitry 34 may include one or more reduced instruction set (RISC) or complex instruction set (CISC) processors. The memory 32 may include a tangible, non-transitory, computer-readable medium that is implemented and/or operated to store data and/or executable instructions. As such, the memory 32 may include volatile memory, such as random access memory (RAM), and/or nonvolatile memory, such as read-only memory (ROM), flash memory, a solid-state drive (SSD), a hard disk drive (HDD), or any combination thereof. The memory 32 may store a variety of information and may be used for various purposes. For example, the memory 32 may store processor-executable instructions (e.g., firmware or software) for the processing circuitry 34 to execute, such as instructions for controlling the agricultural system 8. The operation control system 30 may also be located in any suitable portion of the agricultural system 8. By way of example, the operation control system 30 may be located within the cab 14, on the agricultural implement, at any other suitable location, or at multiple, different locations.

The operation control system 30 is communicatively coupled to the user interface 28 to facilitate control of the agricultural system 8 based on user input. For example, the operator may interact with the user interface 28, and the operation control system 30 may receive a signal from the user interface 28 based on the interaction between the operator and the user interface 28. The operation control system 30 may then control the agricultural system 8 based on the signal. By way of example, the operator may use the user interface 28 to instruct the work vehicle 10 to adjust a position of the agricultural implement and/or to instruct the agricultural implement to perform a particular function.

The operation control system 30 may also automatically operate the agricultural system 8 (e.g., without user input, with limited user input, etc.). The operation control system 30 may determine a location of the agricultural system 8, such as of the work vehicle 10, and the operation control system 30 may cause the agricultural system 8 to perform an operation based on the location. To this end, the agricultural system 8 includes a sensor 36 (e.g., a global positioning sensor) communicatively coupled to the operation control system 30 and configured to provide sensor feedback indicative of the location of the agricultural system 8. As an example, the user interface 28 may present a path through an agricultural field to the operator. In turn, the operator may control movement of the agricultural system 8 to match with the displayed path. For instance, the operation control system 30 may present information regarding deviation from the path based on data received from the sensor 36, such that the operator may adjust movement of the agricultural system 8 based on the presented information. The path may include multiple trigger points, and the operation control system 30 may instruct the agricultural system 8 to perform a particular operation (e.g., an operation associated with the trigger point) in response to the position of the agricultural system being within a threshold range or threshold distance of each trigger point. That is, the operation control system 30 may compare a current location of the agricultural system 8 (e.g., determined based on feedback from the sensor 36) with the location of each trigger point of the path. In response to determining that the current location of the agricultural system 8 substantially matches the location of one of the trigger points (e.g., the difference in position between the agricultural system and the trigger point is less than a threshold value), the operation control system 30 may instruct the agricultural system 8 to perform the operation associated with the trigger point. In this way, the operation control system 30 may automatically initiate certain operations without operator interaction, thereby reducing a difficulty associated with operation of the agricultural system 8 and/or improving effectiveness of the overall farming operation.

Figure 2:
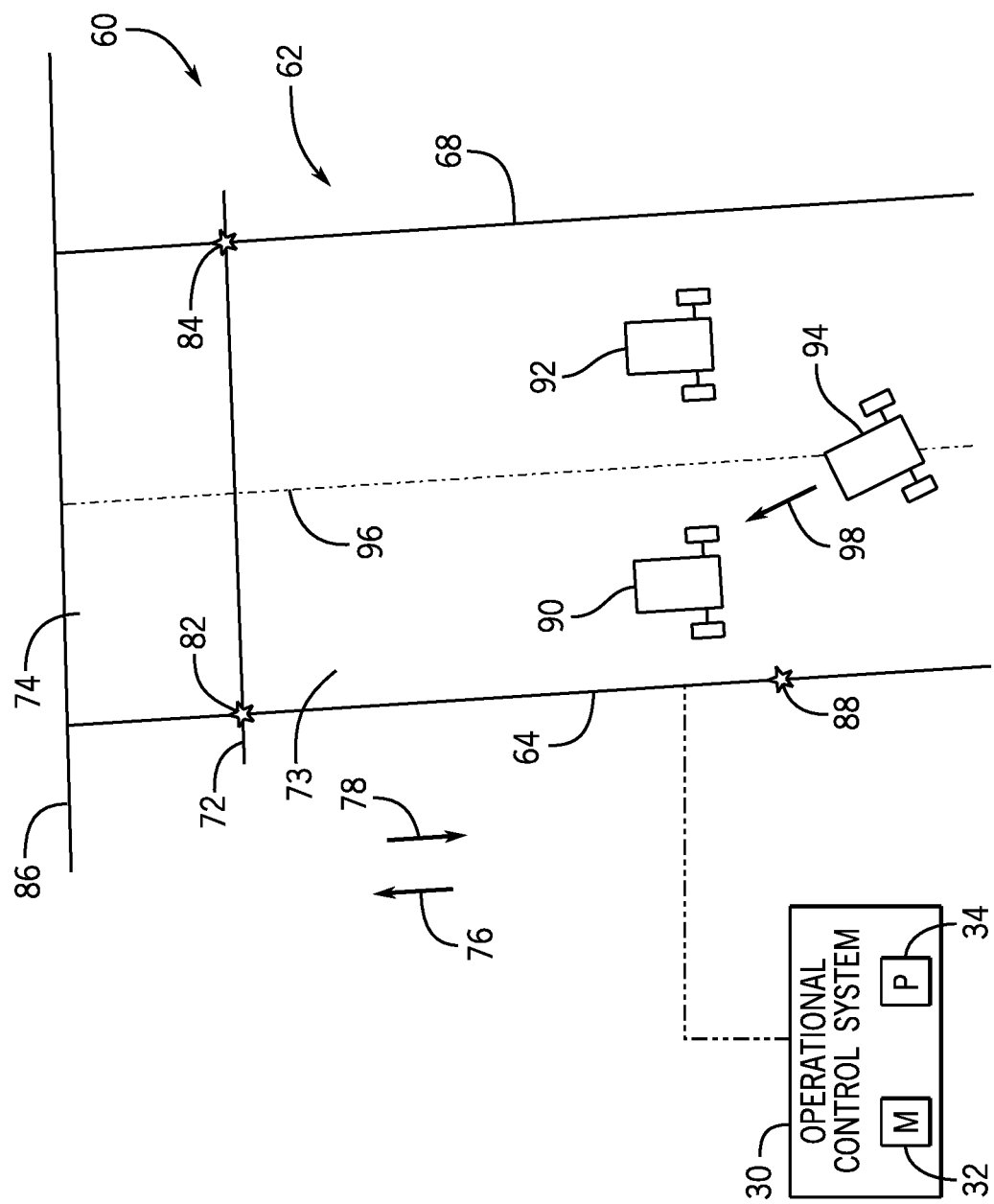
FIG. 2 is a schematic diagram of an embodiment of an agricultural field through which the work vehicle of FIG. 1 may travel, in accordance with an aspect of the present disclosure.

FIG. 2 is a schematic diagram of an embodiment of an agricultural field 60 through which the work vehicle of FIG. 1 may travel. As illustrated, a path 62 is superimposed on the agricultural field 60. The path 62 may be stored on and/or accessible by the operation control system 30. The illustrated path 62 includes a first swath 64 extending along the agricultural field 60 in a first direction 76, a second swath 68 extending along the agricultural field 60 in a second direction 78, and a swath boundary 72 extending through the swaths 64, 68 to indicate respective endpoints of the swaths 64, 68 within a first region 73. While traveling along the swaths 64, 68, the agricultural system may perform a particular farming operation. However, once the agricultural system is past the swath boundary 72, the agricultural system may disengage performance of the farming operation. For example, the swath boundary 72 may separate the first region 73, in which the agricultural system may perform farming operations, from a second region 74, in which the agricultural system may not perform the farming operations. In an example, the agricultural system may perform operations related to transitioning from one swath (e.g., the first swath 64) to another swath (e.g., the second swath 68) while in the second region 74 of the path 62 (e.g., while making a headland turn between the swaths). Such transition operations may include adjusting a position of an agricultural implement (e.g., raising the agricultural implement for the headland turn, and then lowering the agricultural implement for the subsequent swath), adjusting a traveling speed of the agricultural system (e.g., slowing the agricultural system for the headland, and then increasing the speed of the agricultural system for the subsequent swath), adjusting an operation of the motor of the work vehicle, adjusting a gear ratio of a transmission of the work vehicle (e.g., shifting gears of a power shift transmission), another suitable operation, or a combination thereof. In the illustrated embodiment, the agricultural system may travel along the first swath 64 (e.g., in the first direction 76) until the agricultural system is in the second region 74. The agricultural system may then navigate (e.g., turn) in the second region 74 and adjust operation (e.g., to another farming operation) accordingly to prepare for traveling along the second swath 68 (e.g., in the second direction 78).

In some embodiments, the operator of the agricultural system may manually drive the agricultural system along the swaths of the path 62 during the farming operation. As an example, a current position of the agricultural system relative to the path 62 may be displayed to the operator, and the operator may guide the agricultural system to follow each respective swath of the path. However, certain operations of the agricultural system may be performed automatically (e.g., by the operation control system 30) during the farming operation. By way of example, the operation control system 30 may be configured to automatically instruct the agricultural system to initiate the transition operation(s) to transition the agricultural system between swaths. For this reason, the operation control system 30 may be configured to determine whether the agricultural system is in first region 73 or the second region 74, such as by determining whether the agricultural system has crossed the swath boundary 72 to initiate or change farming operation(s).

To this end, the operation control system 30 may instruct the agricultural system to operate based on various trigger points of the path 62. Such trigger points may include endpoints where the swaths, 64, 68 and the second region 74 are separated from one another, for instance. In one example, the first swath 64 includes a first endpoint 82 where the first swath 64 intersects with the swath boundary 72, and the second swath 68 includes a second endpoint 84 where the second swath 68 intersects with the swath boundary 72. In response to determining that the position of the agricultural system is within a threshold range of a specific endpoint, the operation control system 30 may instruct certain components of the agricultural system to initiate a particular transition operation associated with the specific endpoint. Thus, the endpoints 82, 84 may be considered trigger points for the operation control system 30 to initiate or change an operation of the agricultural system. As an example, at the first endpoint 82, the operation control system 30 transitions the agricultural system from a farming operation to a transition operation. Further, at the second endpoint 84, the operation control system 30 transitions the agricultural system from the transition operation to another farming operation.

In certain embodiments, the operation control system 30 may control certain characteristic(s) of each respective farming operation for each swath, such as based on a condition (e.g., contour, soil condition, etc.) of the section of the agricultural field 60 associated with the particular swath, a type of agricultural crop, etc. For instance, the characteristic(s) of the farming operation (e.g., the height of the agricultural implement above the soil surface, the output rate of agricultural product, etc.) performed along the first swath 64 may be different than the characteristic(s) of the farming operation performed along the second swath 68. Thus, the transition operation(s) performed by the agricultural system to transition from the completed swath (e.g., the first swath 64) to the subsequent swath (e.g., the second swath 68) may include adjusting the characteristic(s) of the farming operation. By way of example, the implement may be at a first height at the first swath 64, the implement may be raised to a second height that is higher than the first height in the second region 74, and the implement may be lowered to a third height that is between the first height and the second height for the second swath 68.

For instance, the operation control system 30 may determine that the agricultural system is to traverse/is traversing the first endpoint 82 by traveling from the first region 73 to the second region 74 (e.g., the agricultural system crosses the first endpoint 82 by traveling in the first direction 76). The first endpoint 82 may be associated with an end operation, which transitions the agricultural system from a farming operation to a non-farming operation. In response to the agricultural system traversing the first endpoint 82, the operation control system 30 may instruct certain components of the agricultural system to perform the end operation to transition the agricultural system from a first farming operation associated with the first swath 64 to a non-farming operation associated with the second region 74. Moreover, the operation control system 30 may determine that the agricultural system is to traverse/is traversing the second endpoint 84 by traveling from the second region 74 to the first region 73 (e.g., the agricultural system crosses the second endpoint 84 by traveling in the second direction 78). Thus, the second endpoint 84 may be associated with a start operation, which transitions the agricultural system from a non-farming operation to a farming operation. In response to the agricultural system traversing the second endpoint 84, the operation control system 30 may instruct certain components of the agricultural system to perform the start operation to transition the agricultural system from the non-farming operation associated with the second region 74 to a second farming operation associated with the second swath 68.

In additional or alternative embodiments, rather than associating each endpoint with one of a start operation or an end operation, each endpoint may be associated with both a corresponding start operation and a corresponding end operation, and the operation control system may select whether to instruct certain components of the agricultural system to perform the start operation or the end operation based on a determined direction of movement of the agricultural system. For instance, the operation control system may instruct certain components of the agricultural system to perform the end operation in response to determining that the agricultural system has crossed an endpoint (e.g., the first endpoint) by traveling in the first direction from the first region to the second region. In contrast, the operation control system may instruct certain components of the agricultural system to perform the start operation in response to determining that the agricultural system has crossed an endpoint (e.g., the first endpoint) by traveling in the second direction from the second region to the first region. Although the swath boundary 72 is substantially straight to connect the first endpoint 82 with the second endpoint 84 in the illustrated embodiment, in other embodiments, the swath boundary may have any suitable shape (e.g., a curved shape, a step profile, etc.), and the endpoints may be located at any suitable position along the respective swaths. Moreover, the path 62 may include a path boundary 86, which may be positioned remote from the swath boundary 72 and may correspond to an end of the entire path 62. The path boundary 86 may be associated with another operation of the agricultural system. By way of example, it may not be desirable for the agricultural system to cross the path boundary 86 (e.g., because the path boundary 86 corresponds to the navigable end of the field). As such, the operation control system 30 may be configured to output a notification to the operator in response to determining that the agricultural system is located outside of the path boundary 86 (e.g., outside of the first region 73 and the second region 74). The operator may then adjust the operation of the agricultural system accordingly, such as to navigate the agricultural system toward the first and second regions 73, 74.

It should be noted that the path 62 may include any suitable number and/or configurations of swaths and associated endpoints. In an example, the path may include another boundary, opposite the swath boundary, thereby defining additional endpoints for the swaths. As such, each swath may have two associated endpoints. In another example, the path may include additional swaths along which the agricultural system may traverse, and each swath may include any suitable number of endpoints (e.g., one endpoint, two endpoints). In a further example, at least one swath may have a non-linear shape, such a curved shape, rather than the substantially straight shape illustrated in FIG. 2. Indeed, the path 62 may have any suitable configuration that enables the agricultural system to effectively perform the farming operation on the agricultural field 60.

The operation control system 30 may also instruct certain components of the agricultural system to initiate other operations at other locations in the path 62. As an example, at a trigger point 88 of the path 62, the operation control system 30 is configured to instruct a change in an operation of at least one component of the agricultural system, such as to accommodate a change in condition of the agricultural field 60 or another factor. In certain embodiments, the path 62 may be adjustable or customizable by the operator. For example, the path 62 may include certain default endpoints and/or trigger points, and the operation control system 30 may instruct certain components of the agricultural system to perform an operation in response to the position of the agricultural system being within a threshold range of a default endpoint/trigger point. In addition, the operator may add, remove, or modify the endpoints and/or trigger points of the path 62 (e.g., via the user interface). The operation control system 30 enables manual control of movement of the agricultural system through the agricultural field and does not automatically guide the agricultural system through the agricultural field, thereby reducing a cost and/or complexity associated with implementing an automatic guidance system that controls movement of the agricultural system through the agricultural field. Moreover, the operation control system 30 enables automatic control of certain operations (e.g., farming operations) of the agricultural system, thereby reducing an amount of user interaction needed to operate the agricultural system. That is, based on the location of the agricultural system within the agricultural field, as caused by the manually controlled movement of the agricultural system, the operation control system 30 may automatically instruct certain components of the agricultural system to perform suitable operation(s). In this way, the operator may control movement of the agricultural system without monitoring/controller other operations of the agricultural system.

As described herein, the operator may not precisely guide the agricultural system along the swaths 64, 68. As a result, the agricultural system may not directly traverse at least one of one of the endpoints 82, 84, the trigger point 88, or another suitable endpoint/trigger point. Accordingly, the operation control system 30 may instruct certain components of the agricultural system to perform an operation when the agricultural system is within a threshold range of a nearby endpoint 82, 84 or trigger point 88. In addition, the operation control system 30 may associate the current position of the agricultural system with one of the swaths 64, 68. In some embodiments, the operation control system 30 may select the associated swath based on a proximity of the swath to the current position of the agricultural system. By way of example, an illustrated first position 90 of the agricultural system may be closer to the first swath 64 than to the second swath 68. Thus, the operation control system 30 may associate the first position 90 with the first swath 64, and the operation control system 30 may control certain components of the agricultural system based on the first farming operation associated with the first swath 64. Furthermore, an illustrated second position 92 of the agricultural system may be closer to the second swath 68 than to the first swath 64. Therefore, the operation control system 30 may associate the second position 92 with the second swath 68, and the operation control system 30 may control certain components of the agricultural system based on the second farming operation associated with the second swath 68. For example, the operation control system 30 may instruct the agricultural system to perform a first operation when crossing the swath boundary 72 along the first swath 64, and the operation control system 30 may instruct the agricultural system to perform a second operation when crossing the swath boundary 72 along the second swath 68. Further still, in certain embodiments, the path has endpoints and trigger points but no swaths. As such, the operation control system may control operation of the agricultural system based on a position of the agricultural system relative to the endpoints and/or trigger points without determining the swath associated with the position of the agricultural system.

Moreover, while the agricultural system is in an illustrated third position 94, the agricultural system is located along a first midline 96 positioned substantially in the middle between the first swath 64 and the second swath 68. Thus, the third position 94 may be equidistant to the first swath 64 and to the second swath 68. To associate the agricultural system with one of the swaths 64, 68, the operation control system 30 may be configured to determine an orientation of the agricultural system while the agricultural system is in the third position 94. As an example, the operation control system 30 may determine that the agricultural system is oriented at a first direction 98, which is directed toward the first swath 64. Therefore, the operation control system 30 may associate the third position 94 of the agricultural system with the first swath 64. That is, if the agricultural system is within a threshold range or threshold distance of the first midline 96, the operation control system 30 may determine the orientation of the agricultural system and may then select the swath toward which the agricultural system is pointing.

In some embodiments, the operation control system 30 may also instruct the user interface to present certain information (e.g., on a display of the user interface) related to the swath that the agricultural system is traversing. By way of example, at the first position 90 and/or at the third position 94 of the agricultural system, the operation control system 30 may instruct the user interface to present information associated with the first swath 64. At the second position 92 of the agricultural system, the operation control system 30 may instruct the user interface to present information associated with the second swath 68. Such information may include a distance between the current position of the agricultural system and the associated endpoint 82, 84, details regarding the farming operation associated with the selected swath, other suitable information, or a combination thereof.

Figure 3:
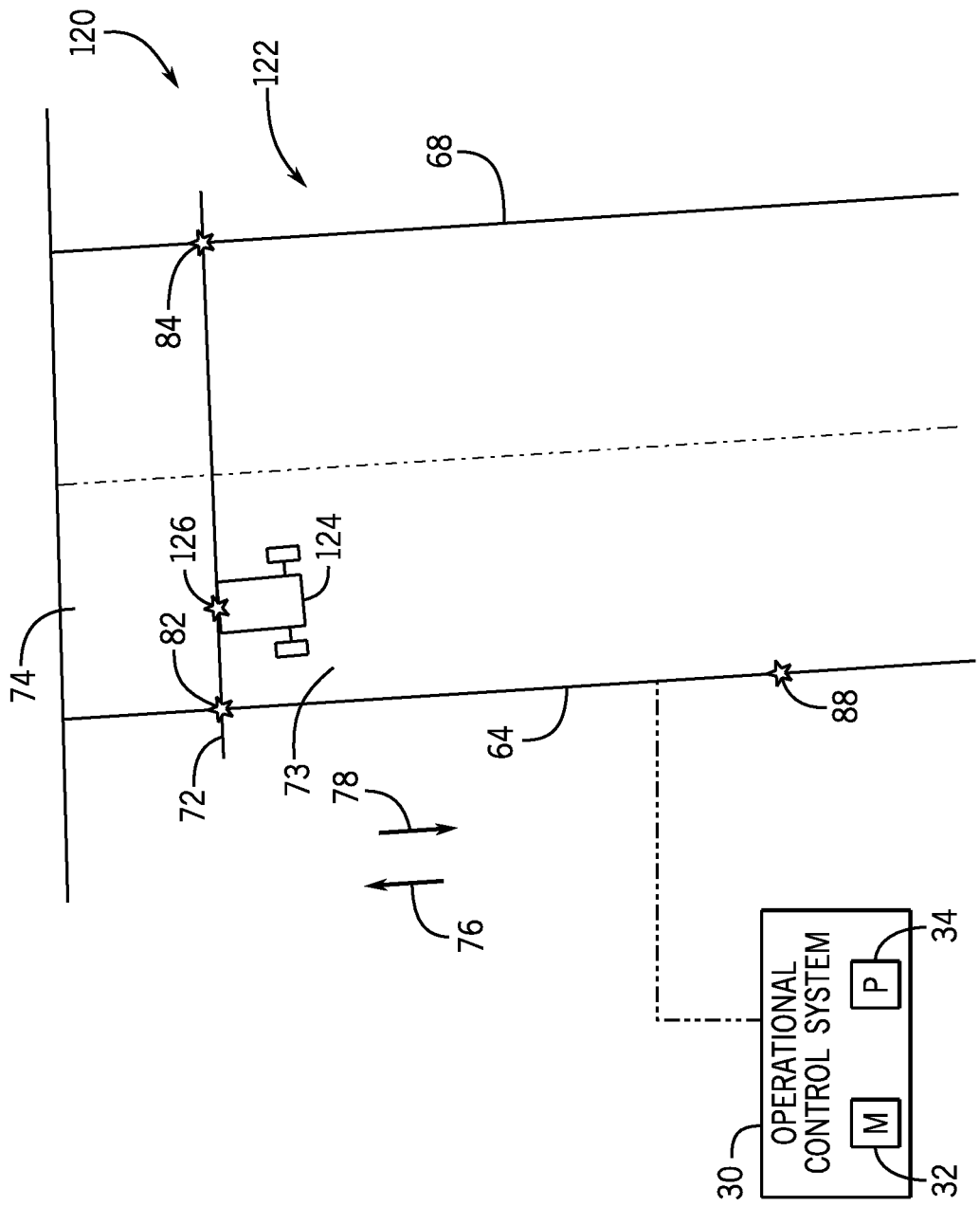
FIG. 3 is a schematic diagram of an embodiment of an agricultural field through which the work vehicle of FIG. 1 may travel, in accordance with an aspect of the present disclosure.

FIG. 3 is a schematic diagram of an embodiment of an agricultural field 120 through which the work vehicle of FIG. 1 may travel. As illustrated, a path 122 is superimposed on the agricultural field 120, and the agricultural system is positioned at a fourth position 124 within the agricultural field 120. The illustrated fourth position 124 is closer to the first swath 64 than to the second swath 68. For this reason, the operation control system 30 may associate the fourth position 124 with the first swath 64, and the operation control system 30 may instruct the user interface to present information associated with the first swath 64. Moreover, the agricultural system crosses the swath boundary 72 at a first crossing point 126 in the fourth position 124, thereby indicating a transition between the first region 73 and the second region 74. The fourth position 124 may be within a threshold range or threshold distance of the first swath 64, and the operation control system 30 may therefore associate the first crossing point 126 with the first endpoint 82 of the first swath 64. Accordingly, the operation control system 30 may instruct certain components of the agricultural system to initiate the transition operation associated with the first endpoint 82. For example, the operation control system 30 may determine that the agricultural system crossed the swath boundary 72 at the first crossing point 126 by traveling in the first direction 76 and therefore the operation control system 30 instructs certain components of the agricultural system to initiate the end operation that causes the agricultural system to change from the first farming operation to the non-farming operation. In this way, the operation control system 30 may instruct certain components of the agricultural system to initiate the transition operation associated with the first endpoint 82 when the agricultural system traverses the swath boundary 72 at the first crossing point 126, even though the first crossing point 126 does not precisely match with the first endpoint 82.

Figure 4:
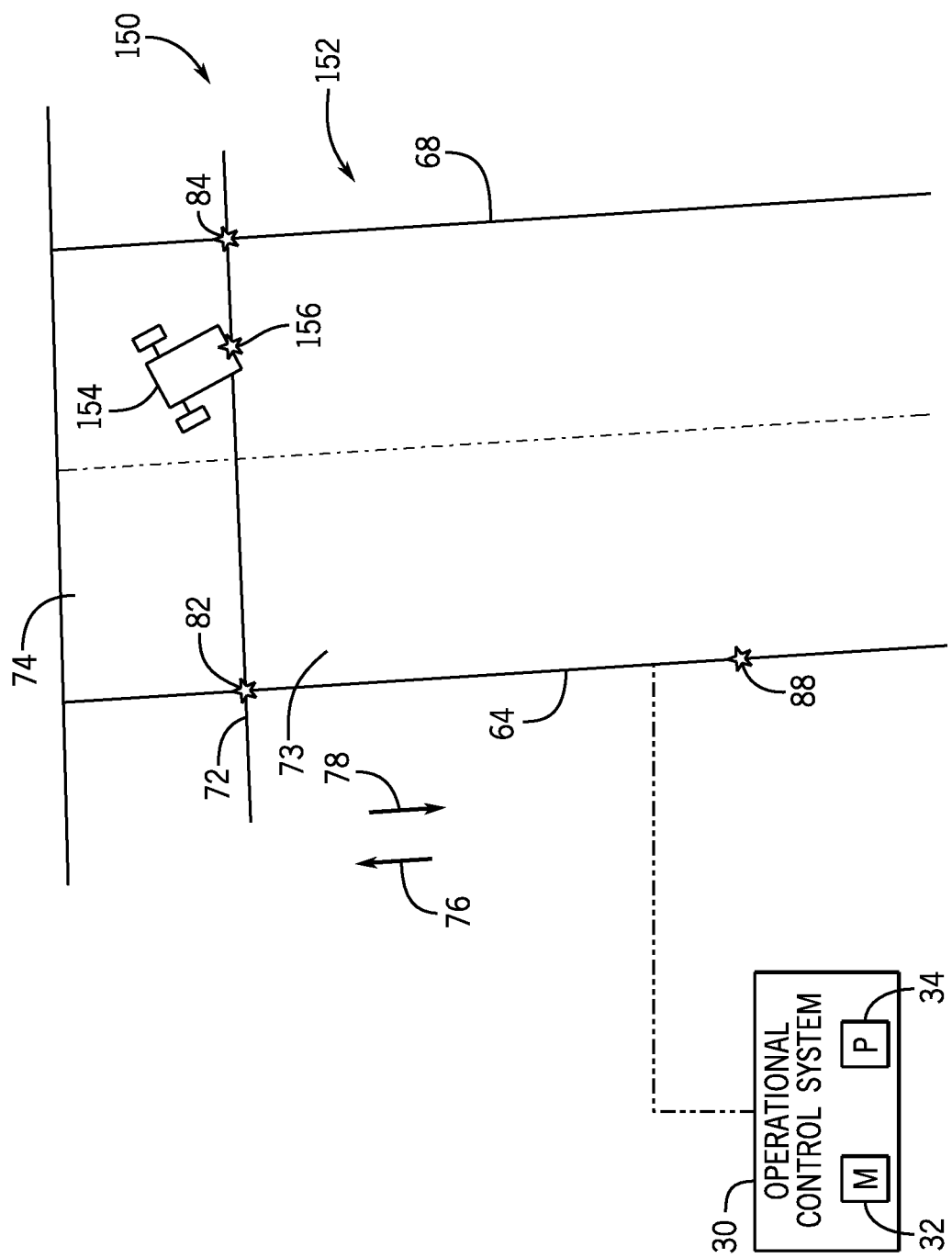
FIG. 4 is a schematic diagram of an embodiment of an agricultural field through which the agricultural system of FIG. 1 may travel, in accordance with an aspect of the present disclosure.

FIG. 4 is a schematic diagram of an embodiment of an agricultural field 150 through which the agricultural system of FIG. 1 may travel. As illustrated, a path 152 is superimposed within the agricultural field 150, and the agricultural system is positioned at a fifth position 154 within the agricultural field 150. The illustrated fifth position 154 is closer to the second swath 68 than to the first swath 64. Therefore, the operation control system 30 may associate the fifth position 154 with the second swath 68, and the operation control system 30 may instruct the user interface to present information associated with the second swath 68. The fifth position 154 also crosses the path boundary 86 at a second crossing point 156, thereby indicating another transition between the first region 73 and the second region 74. The fifth position 154 may be within a threshold range or threshold distance of the second swath 68, and the operation control system 30 may associate the second crossing point 156 with the second endpoint 84 of the second swath 68. Thus, the operation control system 30 may instruct certain components of the agricultural system to initiate the transition operation associated with the second endpoint 84. In the illustrated example, the operation control system 30 may determine that the agricultural system crossed the swath boundary 72 at the second crossing point 156 by traveling in the second direction 78. For this reason, the operation control system 30 instructs certain components of the agricultural system to initiate the start operation that causes the agricultural system to change from the non-farming operation to the second farming operation associated with the second swath 68. As such, the operation control system 30 may instruct certain components of the agricultural system to initiate the transition operation associated with the second endpoint 84 in response to determining the agricultural system traverses the swath boundary 72 at the second crossing point 156, even though the second crossing point 156 does not substantially match with the second endpoint 84.

It should be noted that the operation control system may also instruct certain components of the agricultural system to initiate the operations associated with other trigger points of any of the swaths even when the position of the agricultural system does not precisely match with any of the trigger points or with any of the swaths. For instance, each trigger point may include a corresponding threshold range or threshold distance, and the operation control system may determine that the position of the agricultural system is within a threshold range of one of the trigger points, and may therefore instruct certain components of the agricultural system to initiate a corresponding operation associated with the trigger point.

Figure 5:
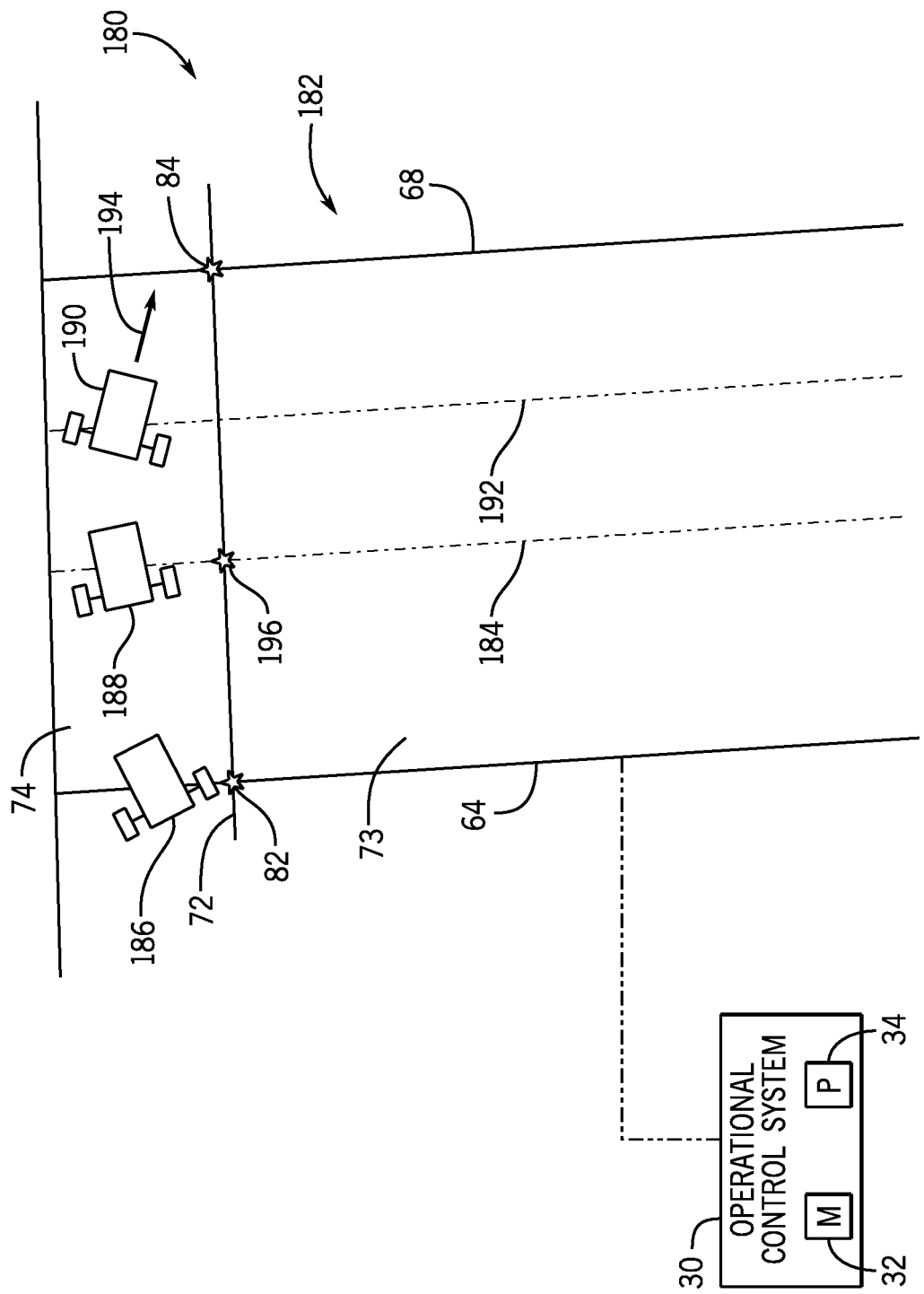
FIG. 5 is a schematic diagram of an embodiment of an agricultural field through which the agricultural system of FIG. 1 may travel, in accordance with an aspect of the present disclosure.

FIG. 5 is a schematic diagram of an embodiment of an agricultural field 180 through which the agricultural system of FIG. 1 may travel. A path 182 is superimposed within the agricultural field 180, and the path 182 includes the first swath 64, the second swath 68, and a third swath 184 between the first swath 64 and the second swath 68. At a certain time, the agricultural system may be positioned at a sixth position 186 within the agricultural field 180. The sixth position 186 may be within a threshold range of the first swath 64, and the operation control system 30 may therefore associate the sixth position 186 with the first swath 64. For this reason, the operation control system 30 may instruct the user interface to present information associated with the first swath 64. At a different time, the agricultural system may be positioned at a seventh position 188 within the agricultural field 180. The seventh position 188 may be within a threshold range of the third swath 184 of the agricultural system, and the operating control system 30 may associate the seventh position 188 with the second swath 68. Therefore, the operation control system 30 may cause the user interface to present information associated with the third swath 184. At an additional time, the agricultural system may be positioned at an eighth position 190 within the agricultural field 180. The eighth position 190 may be along a second midline 192 positioned substantially in the middle between the third swath 184 and the second swath 68. As such, the eighth position 190 may be equidistant to the second swath 68 and to the third swath 184. However, the operation control system 30 may determine that the agricultural system is facing a second oriented direction 194, which is directed toward the second swath 68. For this reason, the operation control system 30 may associate the eighth position 190 with the second swath 68, and the operation control system 30 may cause the agricultural system to present information associated with the second swath 68 at the eighth position 190.

In the illustrated example, the operation control system 30 may instruct the user interface to present information associated with a swath even though the agricultural system does not traverse the swath. For instance, the agricultural system may not cross a third endpoint 196 where the third swath 184 intersects the swath boundary 72. Thus, the operation control system 30 may not instruct certain components of the agricultural system to perform a third farming operation associated with the third swath 184. Instead, the agricultural system may move (e.g., under operator control) from the first swath 64 to the second swath 68 while skipping the third swath 184. However, the operation control system 30 may instruct the user interface to present information associated with the third swath 184 as the agricultural system moves from the first swath 64 to the second swath 68 because during a portion of the movement, the operation control system 30 may determine that the agricultural system is positioned closer to the third swath 184 than to the first swath 64 or to the second swath 68. Thus, the operation control system 30 may associate the position of the agricultural system with the third swath 184 during the portion of the movement even though the agricultural system does not traverse the third swath 184 to perform a farming operation associated with the third swath 184.

Figure 6:
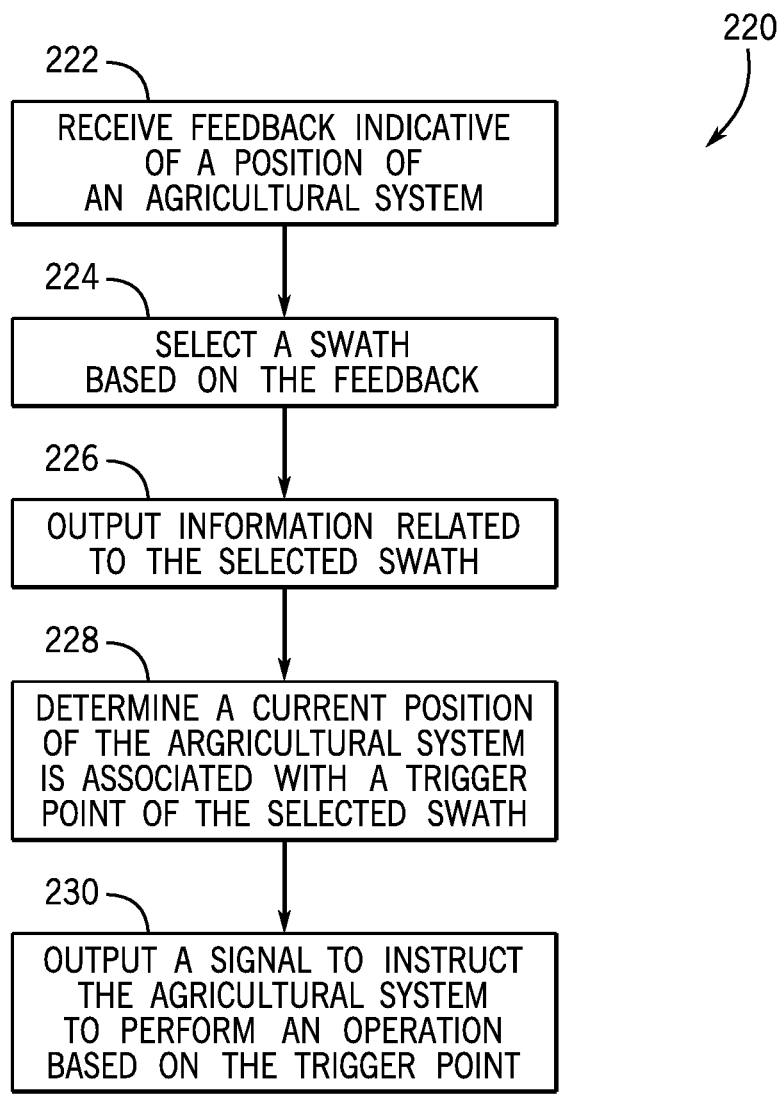
FIG. 6 is a flow diagram of an embodiment of a method for operating an agricultural system based on a position of the agricultural system, in accordance with an aspect of the present disclosure.

FIG. 6 is a flow diagram of an embodiment of a method 220 for operating an agricultural system based on a position of the agricultural system. In certain embodiments, the steps of the method 220 may be performed by a control system, such as the operation control system. It should be noted that a method that is different than the method 220 depicted in FIG. 6 may be performed for operating agricultural system, such as for a different embodiment of the agricultural system. For instance, additional steps may be performed, and/or certain steps of the method 220 may be removed, modified, and/or performed in a different order.

At block 222, feedback indicative of a position of the agricultural system is received. The feedback may include sensor feedback received from a sensor, such as a location sensor, of the agricultural system. The position may include a position of the agricultural system within an agricultural field, such as within a path associated with the agricultural field. The position may further include an orientation of the agricultural system within the agricultural field and within the path.

At block 224, a swath associated with the path may be selected and associated with the position of the agricultural system. In certain embodiments, the swath may be selected based on the position of the agricultural system. For example, the selected swath may be the swath that is closest to the position of the agricultural system. Moreover, the swath may be selected based on the orientation of the agricultural system. As an example, the position of the agricultural system may be equidistant to multiple swaths, and the orientation of the agricultural system may be used for selecting the particular swath associated with the position of the agricultural system (e.g., based on the swath that the agricultural system is directed toward). In additional or alternative embodiments, the swath may be selected in another suitable manner, such as manually by the user (e.g., to override a default selected swath that is closest to the agricultural system). The swath may be associated with the agricultural system until a new swath is selected, such as based on an updated position of the agricultural system (e.g., causing the agricultural system to be closer to another swath) or a user input selecting a new swath.

At block 226, information associated with the selected swath is output. In some embodiments, the information may be presented to the operator to inform the operator of a current state of the agricultural system (e.g., a current position relative to the swaths of the path) such that the operator may control movement of the agricultural system accordingly. In additional or alternative embodiments, the information may be output as a control signal to a component of the agricultural system, such as another control system configured to control operation of one or more components of the agricultural system. The other control system may then control operation of the one or more components based on the control signal. For example, the information may be output to automatically cause the agricultural system to operate (e.g., navigate) accordingly, such as to steer the agricultural system, to control a speed of the agricultural system, and so forth.

At block 228, a determination is made that a current position of the agricultural system is associated with a trigger point of the selected swath. The trigger point may include an endpoint of the selected swath or any suitable trigger point associated with the selected swath. For instance, a determination may be made that the agricultural system is within a threshold range or threshold distance associated with the trigger point of the selected swath.

In response to the determination that the current position of the agricultural system is associated with the trigger point of the selected swath, a signal may be output to the agricultural system to instruct certain components of the agricultural system to perform an operation based on the trigger point, as indicated at block 230. In an example, a single operation is associated with the trigger point and therefore, the agricultural system is instructed to perform the operation. Such an operation may include a start operation, an end operation, or any other suitable operations. In another example, multiple operations may be associated with the trigger point, and a further determination may be made as to which particular operation is to be performed. In certain embodiments, the further determination may include determining a direction of travel of the agricultural system (e.g., the agricultural system performs a first operation when determined to be traveling in a first direction, and the agricultural system performs a second operation when determined to be traveling in a second direction opposite the first direction), but the further determination may include determining any other suitable factor or parameter, such as of the agricultural system, the agricultural field, and so forth.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C.

The invention claimed is:

1. A control system for an agricultural system, comprising:
   a memory configured to store a path; and
   processing circuitry communicatively coupled to the memory, wherein the processing circuitry is configured to:
      receive feedback indicative of a position of the agricultural system, wherein the position comprises a location of the agricultural system within the path and an orientation of the agricultural system within the path;
      select a selected swath from a plurality of swaths of the path based on the position, wherein each swath of the plurality of swaths comprises a respective trigger point;
      determine that the position of the agricultural system is within a threshold range of the respective trigger point of the selected swath; and
      control a component of the agricultural system to perform an operation associated with the respective trigger point of the selected swath in response to determining that the position of the agricultural system is within the threshold range of the respective trigger point of the selected swath;
   wherein the processing circuitry is configured to select the selected swath in response to the location being within a threshold distance of the selected swath; and
   wherein the processing circuitry is configured to determine the location is substantially equidistant to the selected swath and to an additional swath of the plurality of swaths, and the processing circuitry is configured to select the selected swath based on the orientation of the agricultural system in response to determining the location is substantially equidistant to the selected swath and to the additional swath of the plurality of swaths.

2. The control system of claim 1, wherein the respective trigger point of the selected swath comprises an endpoint of the selected swath, and the operation associated with the respective trigger point of the selected swath comprises a start operation, an end operation, or both.

3. The control system of claim 1, wherein the processing circuitry is configured to output an additional signal indicative of instructions to present information associated with the selected swath.

4. The control system of claim 1, wherein each respective trigger point is associated with a respective operation of the agricultural system.

5. The control system of claim 1, wherein the operation comprises controlling a position of an agricultural implement coupled to a work vehicle of the agricultural system, controlling a traveling speed of the agricultural system, controlling a speed of a motor of the work vehicle, controlling a transmission gear of the work vehicle, or any combination thereof.

6. The control system of claim 1, wherein the orientation of the agricultural system is associated with pointing at the selected swath.

7. A non-transitory computer readable medium comprising executable instructions that, when executed by processing circuitry, are configured to cause the processing circuitry to:
   retrieve a path associated with an agricultural field;
   receive feedback indicative of a position of an agricultural system within the path;
   select a selected swath from a plurality of swaths of the path based on the position being within a threshold distance of the selected swath, wherein each swath of the plurality of swaths comprises a respective trigger point;
   control the agricultural system to perform a farming operation associated with the selected swath;
   determine that the position of the agricultural system is within a threshold range of the respective trigger point of the selected swath;
   control a component of the agricultural system to perform an operation associated with the respective trigger point of the selected swath in response to determining that the position of the agricultural system is within the threshold range of the respective trigger point of the selected swath.

8. The non-transitory computer readable medium of claim 7, wherein the operation associated with the respective trigger point comprises a transition from the farming operation to a non-farming operation.

9. The non-transitory computer readable medium of claim 7, wherein the instructions, when executed by the processing circuitry, are configured to cause the processing circuitry to output information associated with the selected swath to a display of the agricultural system.

10. The non-transitory computer readable medium of claim 7, wherein the respective trigger point is associated with a plurality of operations, and the instructions, when executed by the processing circuitry, are configured to cause the processing circuitry to determine a direction of travel of the agricultural system and to select the operation from the plurality of operations based on the direction of travel.

11. The non-transitory computer readable medium of claim 7, wherein the instructions, when executed by the processing circuitry, are configured to cause the processing circuitry to:
receive additional feedback indicative of an additional position of the agricultural system within the path;
select an additional selected swath associated with the path based on the additional position being within the threshold distance of the additional selected swath, wherein the additional selected swath comprises an additional respective trigger point;
control the agricultural system to perform a second farming operation associated with the additional selected swath, wherein at least one characteristic of the farming operation and the second farming operation is different;
determine that the additional position of the agricultural system is within the threshold range of the additional respective trigger point of the additional selected swath; and
control the agricultural system to perform an additional operation associated with the additional respective trigger point of the additional selected swath in response to determining that the position of the agricultural system is within the threshold range of the additional respective trigger point of the additional selected swath.

12. An agricultural system comprising:
a steering system configured to control movement of the agricultural system based on manual input;
a memory configured to store a path, wherein the path comprises a plurality of swaths; and
processing circuitry communicatively coupled to the memory, wherein the processing circuitry is configured to:
receive feedback indicative of a position of the agricultural system as controlled via the steering system;
select a selected swath from the plurality of swaths based on the position being within a threshold distance of the selected swath; and
control the agricultural system to perform a farming operation associated with the selected swath.

13. The agricultural system of claim 12, wherein the selected swath comprises a trigger point, the trigger point is associated with an operation, the processing circuitry is configured to determine the position of the agricultural system is within a threshold range of the trigger point, and the processing circuitry is configured to control the agricultural system to perform the operation associated with the trigger point in response to determining the position of the agricultural system is within the threshold range of the trigger point.

14. The agricultural system of claim 13, wherein the trigger point of the selected swath comprises an endpoint of the selected swath, and the operation comprises a start operation, an end operation, or both.

15. The agricultural system of claim 12, wherein the position comprises a location and an orientation of the agricultural system, the processing circuitry is configured to determine the location is substantially equidistant to the selected swath and to an additional swath of the plurality of swaths, and the processing circuitry is configured to select the selected swath based on the orientation of the agricultural system in response to determining the location is substantially equidistant to the selected swath and to the additional swath of the plurality of swaths.

16. The agricultural system of claim 15, wherein the orientation of the agricultural system is associated with pointing at the selected swath.

17. The agricultural system of claim 12, wherein the processing circuitry is configured to output a signal indicative of instructions to present information associated with the selected swath.

18. The agricultural system of claim 12, wherein the processing circuitry is configured to:
receive additional feedback indicative of an additional position of the agricultural system as controlled via the steering system;
select an additional selected swath from the plurality of swaths based on the additional position being within the threshold distance of the additional selected swath; and
control the agricultural system to perform a second farming operation associated with the additional selected swath, wherein at least one characteristic of the farming operation and the second farming operation is different.

* * * * *